United States Patent [19]

Russell

[11] 3,842,988
[45] Oct. 22, 1974

[54] APPARATUS ACCOMMODATING PANEL CONSTRUCTION

[75] Inventor: Carl D. Russell, Tulsa, Okla.

[73] Assignee: Aquarius, Inc., Lawton, Okla.

[22] Filed: June 21, 1972

[21] Appl. No.: 264,925

Related U.S. Application Data

[60] Division of Ser. No. 94,100, Dec. 1, 1970, abandoned, which is a continuation-in-part of Ser. No. 56,833, July 21, 1970, abandoned.

[52] U.S. Cl.................. 214/1 SW, 214/1 H, 52/749
[51] Int. Cl................................................ B25j 3/00
[58] Field of Search......... 214/1 H, 1 D, 1 R, 1 SW, 214/1 S; 52/745, 749

[56] References Cited
UNITED STATES PATENTS

| | | | |
|---|---|---|---|
| 3,361,280 | 1/1968 | Traver | 214/1 SW X |
| 3,524,556 | 8/1970 | Miller | 214/1 D |

FOREIGN PATENTS OR APPLICATIONS

| | | | |
|---|---|---|---|
| 920,101 | 3/1963 | Great Britain | 214/1 D |

*Primary Examiner*—Frank E. Werner
*Attorney, Agent, or Firm*—Wilfred G. Caldwell

[57] ABSTRACT

For construction purposes, there is provided a novel method and apparatus for orienting and securing one panel to one or more panels of an array to comprise a wall, floor, ceiling or the like. The panel may be joined by contact adhesive along one longitudinal edge to the array or along two adjacent edges. In either event the apparatus insures fitting of the panel to the array prior to the application of adhesive, withdraws the panel from the array along a predetermined path to a predetermined location for application of the adhesive, then contacts the panel edges to the array to distribute adhesive along the edges to be bonded and removes the panel to the predetermined position until the adhesive reaches its optimum setting point. Then all points of the edges to be bonded are caused to contact simultaneously because the panel is moved along the predetermined path to its array position. One embodiment affixes panels in the vertical plane but brings them to the horizontal plane to facilitate the application of adhesive, and returns them for bonding without disturbing the final alignment. A modification of this embodiment enables tilting, angling, and skewing of the panel relative to a fixed floor or platform supporting the base of the machine to insure coplanar alignment of the panel to the array prior to bonding.

5 Claims, 28 Drawing Figures

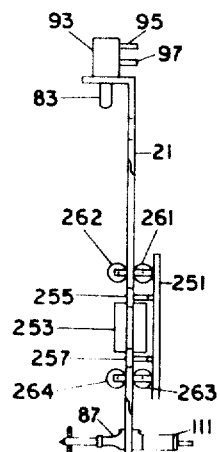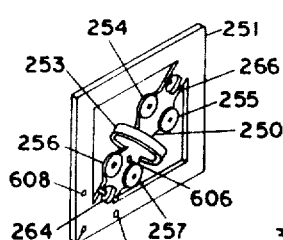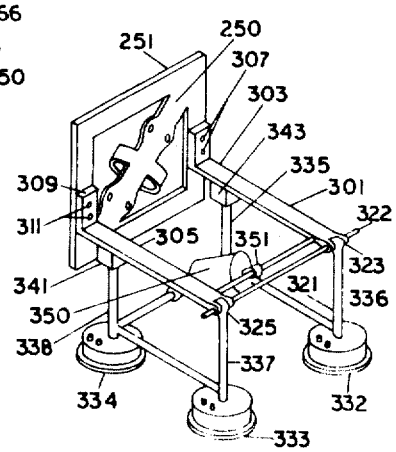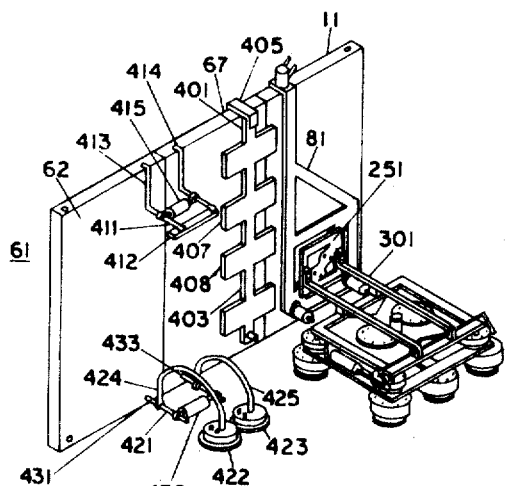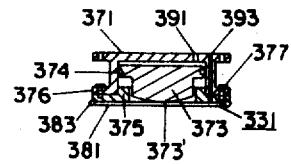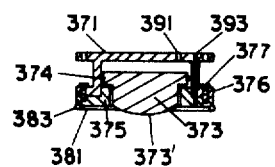

PATENTED OCT 22 1974 3,842,988
SHEET 4 OF 5
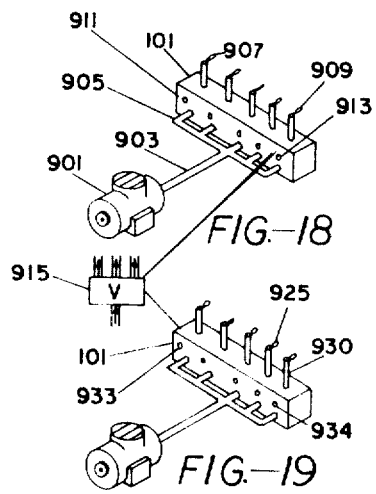
FIG.-18
FIG.-19
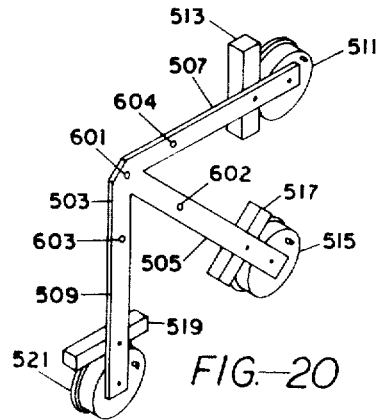
FIG.-20
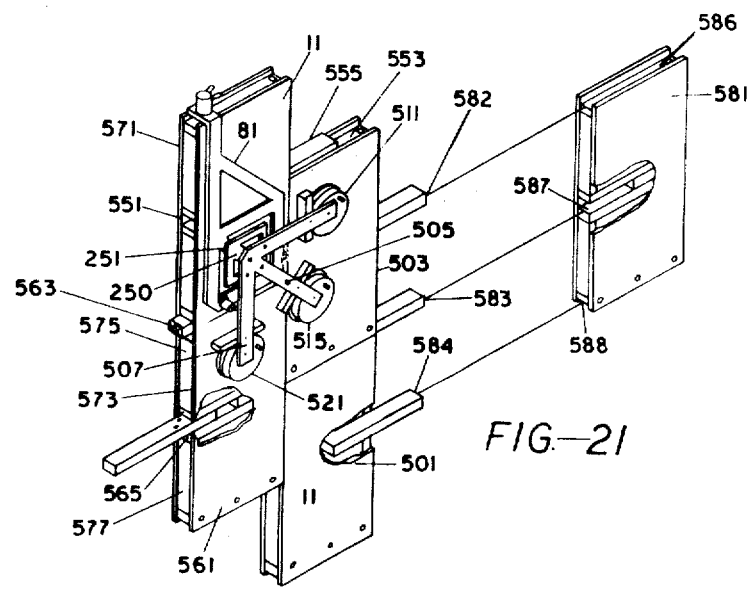
FIG.-21

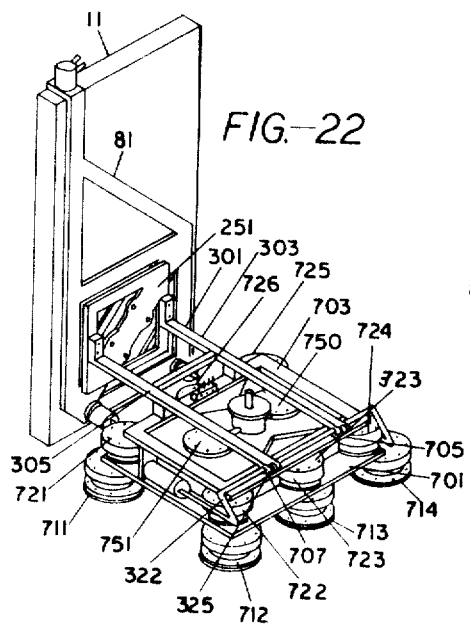
FIG.-22
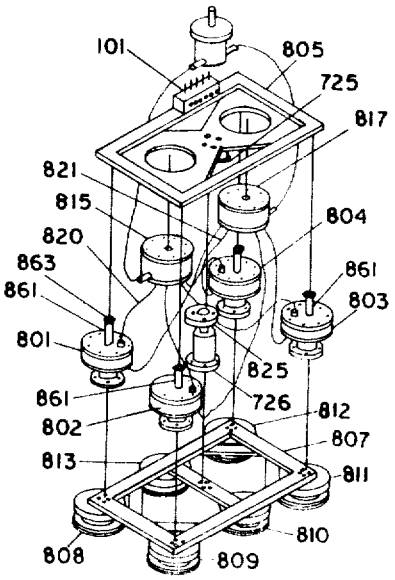
FIG.-23
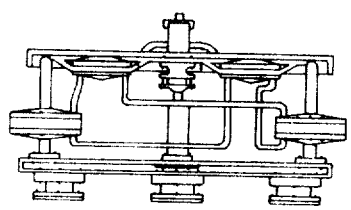
FIG.-24
FIG.-27A
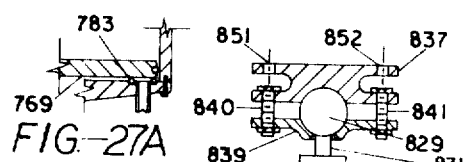
FIG.-26
FIG.-25
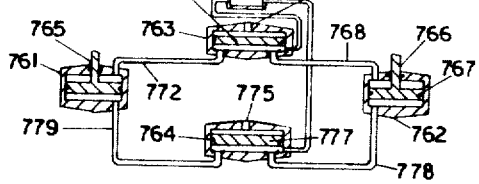
FIG.-27

APPARATUS ACCOMMODATING PANEL CONSTRUCTION

This application is a divisional application of Ser. No. 94,100 filed Dec. 1, 1970 and entitled METHOD AND APPARATUS ACCOMMODATING PANEL CONSTRUCTION, now abandoned. Said Ser. No. 94,100 was a continuation-in-part application of Ser. No. 56,833 filed on July 21, 1970 and entitled THE CDR CONSTRUCTION PANEL INSTALLER, now abandoned.

The invention relates to a novel method and apparatus for orienting, aligning, and securing one panel to one or more panels in an array. The array may comprise a partial wall of a building to which panels are added by longitudinal edge contact to complete the same, or it may comprise a roof, floor, or ceiling wherein panels are added by making exact contact along adjacent edges of one or more panels of the array.

In this manner, the method of the invention enables the construction of a dwelling, house, or other building or construction on the site, through the use of one of the embodiments of the apparatus herein described.

With the advent of modern, light-weight, but durable, construction materials, and substantially improved adhesive, it has now become possible to erect buildings employing modular units precision manufactured to predetermined dimensions at remote points and shipped to the site. Usually, the modular units are panels which have the same external dimensions, but the various panels may differ by incorporating openings therethrough or the like for windows, doors, air conditioning units, fans, etc., or they may include matching paneling, offset or inlaid coatings or decorative material.

One available commercial panel, suitable for use in modular construction, is comprised of a peripheral frame, such as a rectangle of 2×2's, having external dimensions of 4 feet in width by 8 feet in height. Opposing facings, usually of plywood, sandwich insulation, such as polyurethane, within the 2×2 frame enclosure and close the same to comprise the construction panel.

Such panels may be modified to serve as the building blocks for the present invention through the provision of precisely located and orientated apertures to enable predetermined engaging of each panel so that it may be handled in precisely the same manner as other panels in erecting the structure. Preferably, a pair of aligned apertures penetrates the panel through opposing facings and the frame adjacent to one edge, usually the bottom edge. A corresponding pair of apertures extend in parallel relation to one another (but in orthoginal relation to the first mentioned pair) penetrate the edge (e.g., top) opposite said adjacent edge to enable exact predetermined gripping of the panel by a panel frame holder through the use of reciprocating pins or grippers adapted for automatic release of the panel after it has been properly secured in position.

The panel frame holder is carried by a directional carriage or guideway which is provided to move the panel via the panel holder frame along a predetermined path for mating with one or more already placed panels. The mating may occur only along the longitudinal edges, as is possible in the construction of a wall one panel high, or it may occur along adjacent right angle edges, as in the construction of coplanar arrays exceeding one panel in dimension, i.e., two story walls, floors, roofs, ceilings or the like. In either event, the panel is brought into contact with the array along a predetermined path that does not move the panel parallel with the edges of the array to be contacted. Where right angle or parallel edges are involved, the predetermined path is 45°.

However, for other geometric shapes, such as equilateral triangles, the insertion of one triangle between adjacent triangles involves a predetermined path of 30°, along which the one triangle travels relative to the edges of the array already existing, and the principles herein disclosed will apply to the assembly of various other shapes and configurations in the same manner.

In the apparatus, the panel is held by the panel frame holder, in turn, adapted for movement along the predetermined path through the provision of the directional carriage or guideway means, which is preferably pivotally connected to a base securing means. The pivotal connection is desirable in order that panels making up a vertical wall may be pivoted into a horizontal position or plane so that adhesive may be applied easier along the edge or edges to be joined. Then the panel is pivoted back to its vertical position with the adhesive bearing edges spaced a predetermined distance from the edges to be contacted. Operation of driving means, such as a piston, for moving the panel holder frame relative to the directional carriage or guideway means then enables the panel lightly to contact the array and distribute adhesive to the array edges to be joined, the panel being quickly removed to its spaced predetermined position for a time interval to enable the adhesive to reach its optimum bonding point. Then, the driving means is again actuated to move the panel edge or edges into precise simultaneous contact with the edge or edges of the array to be joined, such that the panel is located in its proper position as the adhesive edges contact the array edges to bond, thereby avoiding misjoinder which would require cutting away of one or more panels, resulting in the destruction of the same.

The base securing means is equipped with vacuum cups for firmly securing, or attaching it to a surface in order that the predetermined path may be fixed relative to that surface. For example, if the machine is being used to lay a floor, the surface upon which it rests is ordinarily that portion of the floor already laid, and the same is true with the roof. However, if the machine is installing a wall, it is generally moved to progressive locations along the pre-existing floor or a platform along the wall being installed. Thus, the vacuum cups include pressure and vacuum lines, the pressure line serving to drive a piston against the floor for moving the machine. The piston thus includes a polished lower surface or a surface including on or more rollers. The vacuum cup includes an "O" ring through which the piston extends or retracks. The vacuum connection insures that the vacuum suction between the cup within the "0" ring area and the floor or other surface to which it is holding.

In a further embodiment of the invention, an orientable base is included between the base securing means and the frame supporing means, which orientable base is carried by a universal pedestal for orientation into any position and locking in such position to insure that the panel handling frame will follow the correct predetermined path properly to locate the panel in its attachment or required coplanar position. Two or more valves may be used to control two or more locking and alignment pistons for tilting, angling, or rocking the orientable base, in turn to displace the frame supporting means, directional carriage and panel handling frame to insure proper positioning of the panel. In embodiments incorporating this feature, the orientable base is held in its desired orientation by vertical extensions of the locking and alignment pistons which are locked in the desired positions by their associated valves through pressure locks.

A further embodiment of the invention provides only for the laying of floors, ceilings and roofs. It accommodates panels specially designed for incorporating internal reinforcing, through studs adapted to extend into adjacent panels along guideways, to reinforce the array. It does not require the pivotal connection because the adhesive is applied when the panel is backed off to its predetermined location relative to the array, but the panel remains in the plane of the array. Thereafter, the panel is caused to travel along a predetermined path to be bonded to the array. However, the same type based securing means may be employed for directly supporting the directional carriage in turn carrying the panel handling frame.

A feature of the invention resides in the provision of remotely extendable locking devices for enabling the panel handling frame to grip the panel using the apertures therethrough. It opens angular locking fingers extended beyond the edges of the aperture with pressure being applied to cause the locking device to grip the panel adjacent edge (usually lower edge) through aperture. The locking device incorporates a second piston for driving the locking shaft through the hollow shaft to open the locking fingers on the reverse side of the panel. Thus, a pressure-vacuum system remotely locks and unlocks the machine to and from the panel.

With the foregoing in mind, the object of the invention is to provide a unique method and apparatus for handling panels in the construction of building or the like.

The foregoing will be explained in greater detail in the following description relating to the invention in its various embodiments taken in the light of the accompanying drawings wherein:

FIG. 8 is a view in side elevation of the panel holding frame, per se;

FIG. 9 is a view in perspective of the directional carriage or guideway;

FIG. 10 is a view in perspective of the directional carriage supported by the frame supporting means and the base securing means;

FIG. 11 shows the apparatus of FIG. 10 is operative relationship to a panel wall;

FIG. 12 is a view in section of a vacuum cup in holding condition;

FIG. 13 is a view in section of a vacuum cup in non-holding condition to permit movement of the machine;

FIG. 18 shows a typical pressure pump and manifold assembly;

FIG. 19 shows a typical manifold pump and vacuum assembly;

FIG. 20 is a perspective view of the base securing portion of a different embodiment of the invention;

FIG. 21 shows the embodiment of the invention of FIG. 20 in operative relation to an array of panels being assembled as a floor or the like;

FIG. 22 is a view in perspective of a further embodiment of the invention incorporating an orientable base;

FIG. 23 is an exploded view of an assembly similar to that of FIG. 22 to illustrate the operating principle thereof;

FIG. 24 is a view in side elevation of the structure of FIG. 23;

FIG. 25 is a view of a portion of the structure of FIG. 25 in elevation;

FIG. 26 is a detailed view of the universal pedestal;

FIG. 27 is a view of the operating control arrangement for the structure of FIG. 23 and applicable to the structure of FIG. 22; and FIG. 27A is a detailed view of a portion of a locking valve.

Figure 1:
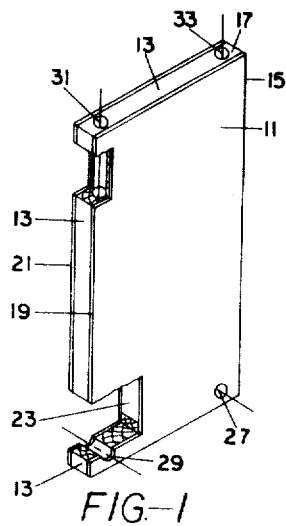
FIG. 1 is a view in perspective of a panel suitable for use in the present invention.

In FIG. 1, there is shown a panel 11 adapted for use in the present invention as a building block. The panel 11 is comprised of a peripheral frame 13 of solid members, such as 2×2's or larger or smaller dimensioned members, depending upon the overall panel dimensions. The usual building panel 11 measures eight feet along the height, shown as edge 15, and four feet along the top, shown as width edge 17.

A front plywood face 19 closes the frame 13 on the visible side of panel 11 in FIG. 1 and a reverse face plywood sheet 21 closes the rear side of frame 13. These plywood facing sheets usually vary in thickness from one-eighth to three-fourth inches. The interior of frame 13 between opposing faces 19 and 21 is filled with foam 23, such as an expanded polyurethane foam, which provides excellent thermal characteristics and renders the dwelling vermin proof for the reason that the polyurethane foam is apparently poisonous to insects and further because the modular construction precludes cracks and crevaces otherwise found in conventional housing.

The panel 11 is then precisely apertured in predetermined positions to enable uniform gripping of the panels by the apparatus. Through apertures 27 and 29 penetrate the lower frame member 13' also, of course, passing through the outer faces 19 and 21 to comprise a pair of apertures extending in a plane normal to the plane of panel 11.

The top edge 17 receives apertures 31 and 33 extending within the plane of the panel 11 which is, of course, a plane orthoginal to the plane of the apertures 27 and 29. The apertures 31 and 33 also take advantage of the peripheral framing 13 and they are located to extend downwardly into the longitudinal framing members such as 13''.

Figure 2:
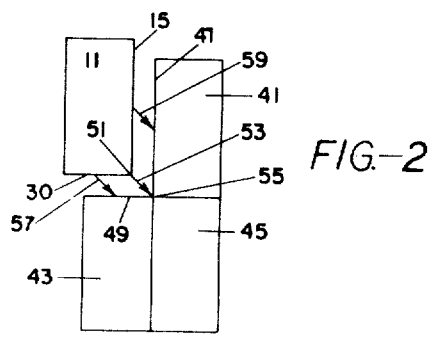
FIG. 2 is a schematic arrangement showing one panel in its predetermined position relative to an array of panels with the arrows indicating the predetermined path of travel for the one panel.

In FIG. 2, there is shown a panel 11, adapted to assemble the two panels 41 and 43 to array 45. Adhesive (not shown) is applied along the edges 15 and 30 of panel 11 and a portion of this adhesive is distributed to edge 47 of panel 41 and edge 49 of panel 43 by light contact with edges 15 and 30 of panel 11, panel 11 being withdrawn to its predetermined positions, as shown in FIG. 2. After the adhesive has dried or set for a few minutes, to its optimum bonding condition, it will bond or contact, being a commercially available contact type adhesive. Thus, it is absolutely necessary that edges 15 and 47 register simultaneously with edges 30 and 49 properly at all points to assemble the panel to the array 45.

This is accomplished by causing panel 11 to follow a predetermined path having an orientation of 45° relative to edges 47 and 49. Thus, the lower right hand corner 51 of panel 11 follows the arrow path 53 to contact junction point 55 between edges 47 and 49. Similarly, edge 30 follows the 45° path indicated by arrow 57 to register with edge 49, and edge 15 follows the 45° arrow path 59 to register with edge 47. Thus, it may be seen that every point on panel 11 or the entire panel itself is guided along the 45° path to establish simultaneously the entire instant bonding contact.

Figure 3:
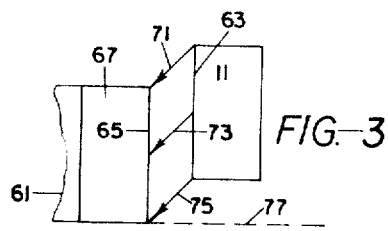
FIG. 3 is a similar view but showing one panel in its predetermined position relative to another panel comprising a portion of a wall with the predetermined path of travel also being indicated by the arrows.

In FIG. 3, there is shown a panel 11 adapted to be joined to an existing wall, represented at 61 by one or more panels. It will be noted that this time the panel 11 is brought from a different direction than panel 11 joining the array 41 of FIG. 2. Also, it is noted that a single edge 63 of panel 11 is to be joined to a single edge 65 of the wall panel 67. Panel 11 is in its predetermined position in which adhesive may be applied along edge 63 and the panel moved to contact edge 65 to distribute adhesive thereto, and then returned to the predetermined position, shown in FIG. 3. Alternatively, the panel 11 may be flipped from the predetermined position of FIG. 3 into a horizontal position, to facilitate the application of the adhesive, and then returned by the apparatus of the invention to the stated predetermined position for subsequent movement along the path indicated by arrow 71, 73 and 75 to permit simultaneous joining of the entire extent of edges 63 and 65. The previously built, or pre-existing floor is represented by the dashed line 77 and the panel 11 may also be glued to floor 77 or otherwise fixed thereto, as desired. For example, baseboards, troughs or channels may be provided to receive panel 11 and cover the lower apertures 27 and 29 (FIG. 1) to seal and enhance the decor or appearance.

Thus, while a pair of apertures 31 and 33 is provided in the top 17 of panel 11 (FIG. 1), it may be noted that one of these apertures may be employed in guiding the panel 11 in one direction, i.e., in the direction shown in FIG. 2, and the other aperture utilized in guiding the panel in an opposite direction i.e., the panel direction followed in FIG. 3. Alternatively, both apertures may be employed if desired for either direction.

Figure 4:
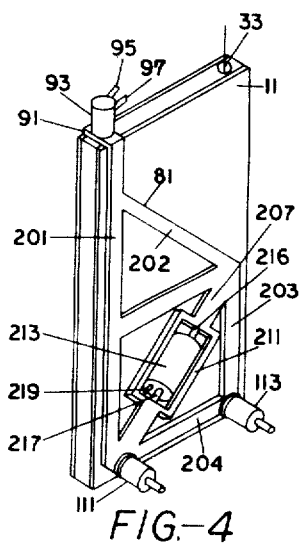
FIG. 4 is a view in perspective of the panel holder frame applied to a panel.

In FIG. 4, it will be noted that the panel 11 is gripped by the panel holding frame 81 through the use of all apertures except aperture 33, pin or plunger 83 (FIG. 5) of panel holding frame 81 being snugly fitted in aperture 31 (FIG. 1), lower pin 85 (FIG. 5) occupying aperture 27 and the other lower pin 87 fitting aperture 29.

Figure 5:
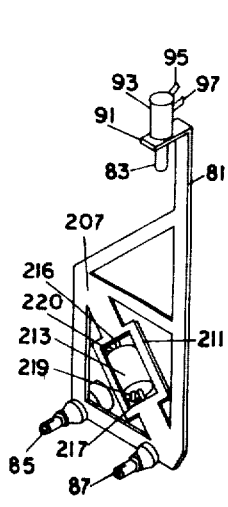
FIG. 5 shows the panel holder frame, per se, in perspective, from the reverse side thereof.
Figure 6:
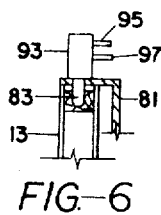
FIG. 6 is a cross-sectional detailed view showing one connection to the panel from the panel holding frame.
Figure 7:
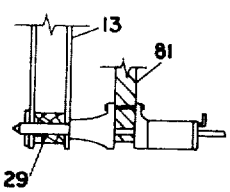
FIG. 7 is a cross-sectional detailed view showing another connection to the panel from the panel holding frame.

As is best seen in FIG. 5, the panel holder frame 81 includes an offset arm 91 extending generally normal to the plane of the panel holder frame to space the remainder of frame 81 away from panel 11. Arm 91 carries a piston 93 which operates the pin or plunger 83. Operation of the piston 93 is under control of a vacuum hose coupling 95 and a pressure hose coupling 97 which extends to a central vacuum or pressure distribution control 101 (FIGS. 18 and 19). This control is provided only to permit remote application of vacuum and pressure to piston 93 to extract or extend pin 83 into the aperture 31.

Of course, in a less semi-automatic type machine these holding pins or grippers may be manually inserted. But the use of remotely controlled pressure and vacuum offers certain advantages in connection with pins 85 and 87 operated by double piston cylinders 111 and 113, details of which are shown in FIGS. 14–17, the two locking devices comprising double piston cylinders 111 and 113 being one and the same. Thus, in FIG. 14 aperture 29 in panel 11 is shown prior to the extension of pin 87, which is in reality a hollow shaft, to the left. The double piston cylinder 111 comprises a base portion 115 having a flat surfaced foot 117, including bore 118, for abutment against panel 11 around aperture 29. The hollow shaft 87 is adapted to be driven along bore 118 through pressure applied against its piston 121, the pressure being introduced through hollow piston rod 125 for travel along its bore 127 and thence via angular passagways 129 and 131 to the cylinder portion 133 of double piston cylinder 111. This drives piston 121 to the position shown in FIG. 15 to cause hollow shaft 87 to penetrate and extend beyond aperture 29, the air or pressure in the foreward portion of cylinder 111 being evacuated through pressure line coupling 135.

Figure 15:
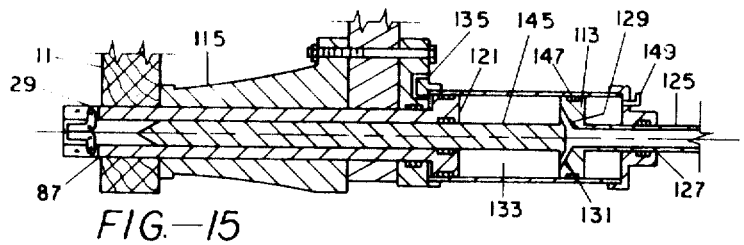
FIG. 15 shows the pin operating device with the hollow shaft penetrating the panel.
Figure 16:
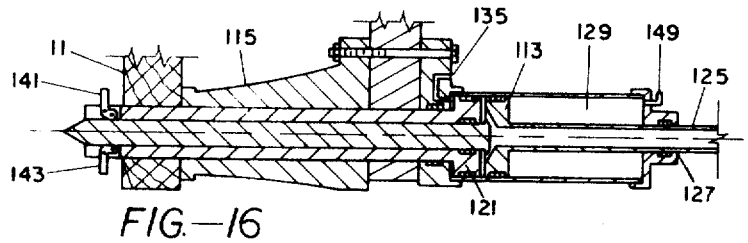
FIG. 16 shows the locking device with the locking pins extended.

Next, it is desired that the locking or gripping fingers 141 and 143 be pivoted from and positioned internally of hollow shaft 87, shown in FIG. 15, to their externally extending positions, shown in FIG. 16. Hence, it is necessary to drive the locking rod 145, from the position shown in FIG. 15, to the position shown in FIG. 16 to pivot grippers or fingers 141 and 143 and to maintain them in their gripping condition. This is achieved by driving the second piston 147 to the left through the introduction of pressure to pressure coupling 149 located at the reverse end of cylinder 133 with air escape being provided through angular passageways 129 and 131 and bore passageway 127. In this connection, it will be noted that hollow piston rod 125 has a length in excess of cylinder 133 to permit the exposed forward extension of locking rod 145 while still maintaining the pressure and pressure release passageways.

Figure 17:
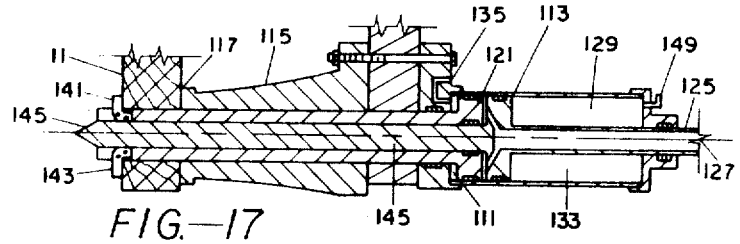
FIG. 17 shows the locking device holding the panel to the panel holder frame.

In FIG. 17, the apparatus in its locked position tightly gripping panel 11 between grippers 141–143 and the foot 117 of base 115, pressure being introduced through coupling 135 to urge piston 121 to the right to achieve this gripping action, pressure coupling 149 serving to release the pressure cylinder 133.

Figure 14:
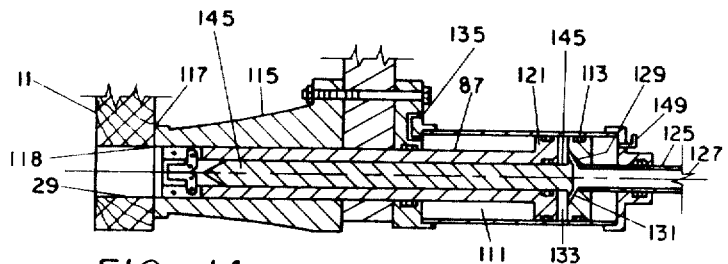
FIG. 14 shows the pin locking device in operative position.

After the panel 11 has been attached in its permanent position, the locking devices 141 and 143 are released and removed from panel 11 by withdrawing locking rod 145 through the application of pressure to bore 127 via hollow piston rod 125 to return it to its position of FIG. 14 and thereafter applying pressure to coupling 135 to return piston 121 to its unlocked position of FIG. 14.

To insure return of grippers 141 and 143 to their closed position for withdrawing hollow shaft 87, at least the tip portion of locking rod 145 may be polarized as a permanent magnet and the grippers composed of soft iron or other magnetizible material to cause them to be returned to their retracted position of FIG. 15 for their withdrawal. An alternative is the use of return springs (not shown), but the magnet approach is preferred as being maintenance free.

Returning to FIGS. 4, 5 and 8, it will now be appreciated that the panel holder frame 81 comprises a longitudinal member 201 with peripheral framing members 202, 203 and 204 defining a plane. A diagonal guiding member 207 is provided, in this case to define the angle of the predetermined path of the arrows of FIGS. 2 and 3 when viewed from both sides of the paper. Obviously, guide member 207 could extend at right angles to itself to provide for movement of the panel in the opposite direction when viewed from the same side of the paper.

Guide member 207 includes a cut away or framing portion 211 adapted for receiving a cylinder and piston 213, the piston shafts 216 and 217 extending outwardly from opposite ends of cylinder piston 213 and being rigidly connected to opposite ends of the frame or cut out 211 provided by member 207. Thus, cylinder 213 is firmly held and its upper piston shaft 216 when driven upwardly, moves the panel holder frame 81 and panel 11 upwardly at the angle of member 207. This is occasioned by application of pressure to lower line 219. The reverse motion by driving piston shaft 216 outwardly of cylinder 213, through application of pressure to coupling 220, causes the panel holder frame and panel 11 to be driven downwardly and to the left in the direction of diagonal guide member 207. To achieve this predetermined movement of panel holder frame 81 through the use of piston cylinder 211, directional carriage 251 of FIG. 9 is provided with a strap 253 for gripping and holding piston cylinder 213 and a guide way for receiving member 207. The guide way comprises upper wheels or rollers 254 and 255 for receiving the upper edges of member 207 and lower wheels or rollers 256 and 257 for receiving the lower edges of member 207. The lower and upper extremities of guide member 207 are securely and tightly held against deviation by a set of rollers carried by the diagonal guideway member 250 of directional carriage 251 in order that absolute minimal tolerance may be assured. The diagonal member 207 of panel holder frame 81 is completely suspended in the rollers which comprise metal such as iron rollers or ball bearings practically imune from wear and preferably adjustable to receive and locate member 207 relative to directional carriage 251. The lateral location is assured by the four rollers 254–257 and the back and forth location is assured by the other pairs of rollers 261–262 and 263–264, all carried from member 250 by straps or arms, such as the extensions 265 and 266 for upper roller 262.

In FIGS. 10 and 11, there is shown the carrier and pivot arrangement for the directional carriage 251. It comprises a frame support 301, made up of arms 303 and 305, affixed to the carriage 251 by the right angle extensions 307 and 309 through the use of screws or rivets, such as 311. These arms are pivotally connected to a base securing frame 321 by a pivot rod 322 which passes through apertured yokes 323 and 325 to permit the carriage 251 to be pivoted from its vertical position to in turn pivot the panel 11 to a horizontal position to facilitate the application of adhesive to its proper edges. Throughout the assembly the parts are heat tempered and the bearing surfaces are machined or built to close tolerances in order that the panels may be assembled in precise predetermined coplanar relationship.

Thus, a firm foundation for the entire apparatus is provided by the base securing frame 321 which rests on four vacuum cups 331, 332, 333 and 334 adapted to be secured to a building floor which is pre-existing or a temporary floor or support provided therefor. The vacuum cups support the four uprisers 335, 336, 337 and 338 which define a plane through the use of the pivot yoke assembly 323 and 325 and flat plates 341 and 343.

This plane may define a home position for the mechanism from which the panel frame holder 81 may be moved upwardly and to the right or downwardly and to the left along guiding member 250. Thus, it may be appreciated that the predetermined position of the panels, such as is illustrated in FIGS. 2 and 3, may also be determined from this home position, usually coinciding with the directional guide 251 in the position illustrated in FIG. 10. The panel holder frame 81 may be biased upwardly and to the right to hold the panel 11 in the position shown in FIG. 3, thereby constituting the predetermined panel position.

Pivoting of the directional guideway 251 from the position shown at FIGS. 10 and 11 to the horizontal plane (not illustrated) is achieved through the piston cylinder 350 pivotally attached to the base securing frame 321 at pivot point 351 and connected over piston shaft 353 to pivot or crank arm 355 in turn connected to the securing frame arm 305. Removal and return of the panel from the vertical to the horizontal position under control of piston 350 may be accomplished at the remote console or control panel 101 (FIGS. 18 and 19).

the vacuum cups 331–334 provide the function of securely holding the securing frame 301 to the floor or temporary platform during operation and enabling its release and movement of the entire machine to an adjacent position for installation of the next panel. The details of a vacuum cup, such as 331, are shown in FIGS. 12 and 13 wherein a frame or cylinder member 371 receives a piston 373 sealed therein by a ring, such as "O" ring 374. The extent of piston movement is determined by the annular sealing ring 375 bolted to flange 376 of cylinder 371 by screws or bolts, such as 377. The annular member 375 includes a large diameter "O" ring 381 glued or force-fitted into an annular groove 383. A pressure line 391 is provided to admit pressure to force piston 373 downwardly to insure that the "O" ring 383 does not contact the floor when the apparatus is moved. Thus, the lowermost surface of piston 373, shown at 373', may be highly polished or may include one or more rollers to facilitate movement of the apparatus. However, when it is desired that the vacuum cup 331 adhere strongly to the supporting floor or platform, vacuum is applied to line 393, after vacuum has been applied to line 391 to raise piston 373 to the position shown in FIG. 12 so that the cup 331 provides suction attraction when the floor or platform.

In FIG. 11, the entire machine is shown locating panel 11 in position relative to panel 67 of array 61. The panel holder frame 81 has been moved downwardly and to the left by the piston 213 driving it relative to the directional guideway 251, and from FIG. 3 it will be appreciated that the arrows 71, 73 and 75 depict the path followed by panel 11 to the position shown in FIG. 11. An additional guide 401 is shown being employed in the construction of FIG. 11. It comprises a longitudinal member 403 with a hook or right angle 405 gripping the top of panel 67. A plurality of cross pieces, such as 407 and 408 extend beyond panel 67 to define the plane of its interior face thereby further insure that the panel 11 is properly positioned, because guide 401 facilitates checking of the position of panel 11 relative to panel 67 prior to the application of adhesive.

Also, in FIG. 11 there is shown a holding device maintaining the alignment of panel 62 with panel 67, which devices are necessary or useful on windy days until the adhesive has thoroughly hardened or set. The upper holding device 411 comprises a body member 412 with arms 413 and 414 extending in angular fashion over the upper corners of panel 67 and 72 to be pinned in the apertures penetrating their respective top edges thereof. A hand operated piston 415 is shown for holding arms 413 and 414 tightly together.

Also, advantage is taken of the lower panel apertures, by holding device 421 which comprises a pair of vacuum cups 422 and 423 of the type heretofore described having arms 424 and 425 extending adjacent to panels 62 and 67 respectively with pins carried thereby, shown at 431 and 433, held in the apertures and secured by hand operated piston 435.

The holding devices 411 and 421 may only be employed for a relatively few minutes or during the connection of panel 11 to panel 67, and when the machine is moved to the next location for attaching a panel to panel 11, these holding devices may be moved, if necessary, to secure panel 11 to panel 67.

A different embodiment of the present invention is shown in FIGS. 20 and 21, and it is particularly adapted for fabricating floors, ceilings and roofs, wherein the movement of the panels from one plane to another plane for applying adhesive is not accomplished because a different approach is employed in constructing these flat horizontal or inclined surfaces. It is necessary to support, from below, the panel 11' (FIG. 21) during its travel to its proper location relative to the array 501 of FIG. 21 and during setting of the adhesive. Thus, the base securing frame comprises a right angle channel or frame 503 which carries an intermediate member 505 between its arms 507 and 509. Arm 507 is supported by vacuum cup 511 (of the type heretofore described) at its extremity and extends over pivot block 513. Similarly, intermediate member 505 is carried by vacuum cup 515 and extends over pivot 517, arm 509 extending over pivot block 519 to vacuum cup 521. This arrangement enables the base securing grame 503 to extend in cantilever fashion beyond the array 501 to support the directional guideway 251 to FIG. 9, piston 213 and panel holder frame 81 of FIG. 4 and panel 11' of FIG. 21 in a precise predetermined position (although basically this panel 11' is supported from beneath but it is aligned for movement along the predetermined path by the machine embodiment of FIGS. 20 and 21).

The operation is as described before without the provision for pivoting the panel, panel holder frame and directional guideway, panel 11' being simply moved an inch or few away from array 501 by piston 213, adhesive applied to the appropriate edges, and then returned to its matching position by operation of piston 213.

Thereafter, internal reinforcing members, such as the pictured 2×2, is inserted in channel 551 to extend halfway into panel 11' and to protrude halfway along the upper channel 553 of panel 555, being available as a reinforcing structure when additional panels are added. It may be seen from viewing the broken away portion of lower lefthand panel 561, that the channel 565 comprises an upper lateral 2×2 shown at 563 and a lower lateral 2×2 shown at 565 spaced therefrom but contained within the opposing faces 571 and 573 and fastened to the vertical edge peripheral frame members, such as 575 and 577. Also, it will be apparent from the view of FIG. 21 that floors and the like are preferably constructed in staggered relation to enable maximum benefit from the reinforcing members located in upper and lower edge channels and intermediate channels as just described.

The right-hand panel 581 of FIG. 21 is shown spaced from the array 501 to illustrate how the reinforcing internal members 582, 583, and 584 fit respectively the upper edge channel 586, intermediate channel 587 and lower channel 588. Of course, it will be appreciated that panel 581 may comprise the initial panel, from which the rest of the array 501 has been laid, and it is clear then that panel 581 will be supported from the bottom. In the case of roofs, obviously the array 501 may be supported in a slanting plane, such as a 30 or 45 degree plane to the vertical, and the machine will then operate from the lowermost roof panel upwardly to the peak or ridge.

It should be noted that in FIG. 20 apertures 601, 602, 603 and 604 are provided in the base securing frame 503 for receiving bolts which pass through, respectively, apertures 605, 606, 607 and 608 of guide 251, shown in FIG. 9. These apertures are the only additional change required relative to the parts heretofore described, because the operation of panel holding frame 81, relative to directional guide 251, is identical to that previously described.

FIGS. 22 through 27 illustrate a further embodiment of the invention which enables the tilting or angling of the panel 11 in order to insure that it will be brought into its proper coplanar orientation and contact with the array, even though the platform or floor upon which the machine is resting is uneven or out of level. Thus, an arrangement is provided for introducing angling, tilting and even skewing into the machine between the base securing frame, shown at 701 in FIG. 22, and the frame support 301, the latter carrying the directional guideway 251, panel holder frame 81 and panel 11. It is the orientable base 703 which is angled, tilted or skewed relative to the base securing frame 701, and the frame support 301 is connected to the orientable base 703 through the yokes 325 and 323 of arms 305 and 303, respectively, by virtue of pin or rod 322 extending through the yokes 325 and 323 and engaging upright inverted U-shaped pin holders 705 and 707.

In FIG. 22 the base securing frame 701 is secured to the floor or other platform by the vacuum cups 711, 712, 713, 714, etc., and the orientable base 703 is supported by piston shafts (not shown in FIG. 22) extending upwardly from locking and alignment pistons 721 through 726. A pair of valves 750 and 751 controls and locks the pistons in any desired position so that the base 703 may be oriented and locked, as desired.

The principle is illustrated in FIG. 27 with respect to two cylinder assembly pistons 761 and 762 operating with two valves 763 and 764. Let it be assumed that piston shaft 765 bears against a table top or the like at one end and piston shaft 766 is similarly not connected to the table top on the opposed edge, and it is desired to tilt the table in tetter-totter fashion. If it is desired to raise the end of the table top associated with shaft 765, this piston 767 is pulled upwardly with both valves 763 and 764 open so that fluid is discharged from the top of piston 767 via line 768 into valve 763 below its closure member 769. The pressure is, of course, relieved from coupling 771 to permit closure member 769 to rise, thereby insuring that conduit 768 opens into valve 763 with vented reservoir 770 provided for excess fluid in this closed fluid system hen the closure member 769 is closed downwardly to lock the openings of conduits 768 and 772 through pressure applied to coupling 771. Similarly, valve 764 is locked through pressure applied to coupling 775 to force closure member 777 downwardly to close conduits 778 and 779 with excess fluid rising in reservoir 770.

Of course, with the valves open, either or both piston shafts 765 and 766 may be positioned as desired to align the table top corresponding to orientable base 703 of FIG. 22, which in turn serves to align the panel 11 for simultaneous coplanar contact along the required edges with the existing array.

In FIG. 27A there is a detailed showing of how the valve closure member 769 closes the opening for conduit 772. An "O" ring 783 surrounds the opening for conduit 772 and when the closure member 769 descends, it merely seals this "O" ring 783 to close off conduit 772. It should be noted that the closure member 769 may be lifted by vacuum applied to coupling 771 and depressed by pressure applied to the same coupling. The entire movement necessary for valve operation is of the order of one-fourth to one-half inch elevation and depression of closure member 769, and thus reservoirs, such as 770, need not be large but the fluid system must be closed.

A great number of pistons and corresponding alignment shafts may be operated from a pair of valves, such as valves 763 and 764, by providing couplings from the tops of the pistons to the bottom of one valve and couplings from the bottoms of the pistons to the bottom of the other valve. It is in this manner that the principle described in FIG. 27 is extended to operate, e.g., six pistons from two valves.

In FIGS. 23 through 26 there is shown a detailed array incorporating the same principle but utilizing four pistons, namely 801, 802, 803 and 804 respectively located at the corners of the orientable base 805 supported from the base securing frame 807. The base securing frame includes the same type vacuum cups 808 through 813.

A pair of valves 815 and 817 is provided with connections from the upper portion of the pistons, such as line 820 from piston 801, extending to the bottom of valve 815, but with connections, such as line 821, extending from the bottom of piston, such as 801, to the bottom of the other valve 817, this pattern being continued for all pistons so that the orientable base may be tilted, angled or tipped as desired. Additionally, a universal pedestal 825 is disposed between the centers of the base securing frame 807 and orientable base 805 to insure full universal movement, i.e., including skewing of the base 805 relative to the base securing frame 807.

The pedestal 825 includes a base 827 adapted to be secured to a cross member 829 of base securing frame 807. At its upper end it carries a ball 829 on a neck 831 extending from the body 833. The body 833, neck 831 and ball 829 may all be machined from the same piece of material or the latter may be machined and attached to the body 833. A universal clamp 835 for ball 829 is provided through an upper body member 837 and a lower body member 839, secured together by the bolts 840 and 841, which clamp the body members in tensioned fashion. The upper body member 837 is adapted to be secured to a panel 850 of the orientable base 805 by bolts through apertures 851 and 852.

Each piston, such as 801, includes an upwardly extending piston rod, such as 861, to carry the orientable base 805 at its four corners. The piston rods, such as 862, include a ball, such as 863, in their upper ends to permit the base 805 ready point contact therewith and movement in any direction therefrom.

It is desirable for high speed operation to operate the machines of the present invention from a remote single location relative to the various moving parts which are simple moved through the use of pressure or vacuum. Pressure, vacuum and timing sequencing control systems are commercially available from many sources, and accordingly, only the valving connections are shown where required. Thus, at the central location there is provided a source of pressure, such as the compresser 901, shown in FIG. 18 supplying the pressure distribution control 101 over line 903 and manifold 905, the individual conduits of which include the valves, such as 907 and 909. Manually operable buttons 911 and 913 are provided for operation of the valves 907 and 909 and a settable timer mechanism is shown at 915 for controlling the period that panel 11 is retracted after applying adhesive to the edges for optimum setting time. The various couplings mentioned throughout the specification requiring pressure are connected to pressure distribution control 101. Similarly, a source of vacuum, such as the vacuum pump 925, also supplies pressure distribution control 101 (from the opposite side) over conduit 927 and manifold 930. Similarly, valves, such as 931 and 932, are controlled by buttons 933 and 934 for performing the various operations.

What is claimed is:

1. Fluid orienting, and alignment apparatus for locating an orientable base in a desired position relative to a fixed base comprising, in combination a pedestal connection extending between the bases; a universal joint connecting the pedestal to one of the bases, and said pedestal being fixed to the other of said bases; a plurality of cylinders carried by the fixed base; a piston in each cylinder; a piston shaft for each piston extending upwardly to contact the orientable base respectively at different locations; a pair of valves each comprising a piston and cylinder; interconnections from a first one of said valves to a first side of the pistons in the cylinders carried by the fixed base; further interconnections from the other of said valves to the second side of the last mentioned pistons; and means for opening and closing said valves to enable fluid distribution to the pistons to locate the orientable base in the desired position.

2. The apparatus of claim 1 wherein each valve comprises a vented reservoir.

3. The apparatus of claim 1 wherein each valve comprises an "O" ring about the interconnections received thereby and said piston in each valve closing and opening the interconnections through contact and lack of contact with the "O" rings to lock and to free the orientable base.

4. The apparatus of claim 1 wherein the universal pedestal extending between the fixed base and the orientable base is disposed substantially centrally of said bases and said piston shafts are substantially uniformly spaced from the pedestal.

5. The apparatus of claim 1 further comprising panel holding frame means; and means between the panel holding frame means and the orientable base for introducing motion of predetermined directions to said panel holder frame means relative to the fixed base.

* * * * *